Sept. 3, 1968  H. J. DONALD  3,400,190
METHOD AND APPARATUS FOR THE EXTRUSION
OF MULTI-LAYER FILM AND SHEET
Filed July 28, 1965

INVENTOR.
Harold Jack Donald
BY Robert B. Ingraham
AGENT

United States Patent Office 3,400,190
Patented Sept. 3, 1968

3,400,190
METHOD AND APPARATUS FOR THE EXTRUSION OF MULTI-LAYER FILM AND SHEET
Harold Jack Donald, Midland, Mich., assignor to The Dow Chemical Company, Midland, Mich., a corporation of Delaware
Filed July 28, 1965, Ser. No. 475,410
13 Claims. (Cl. 264—171)

ABSTRACT OF THE DISCLOSURE

Three layer sheet is simultaneously extruded by inserting into a conventional sheeting die a tube having a slot therein narrower than the width of the slot of the sheeting die and extruding a sheet within the sheeting die which in turn is encapsulated by a major stream of resin. When discharged from the sheeting die, the inner stream and outer stream are generally coextensive.

---

Figure 1:
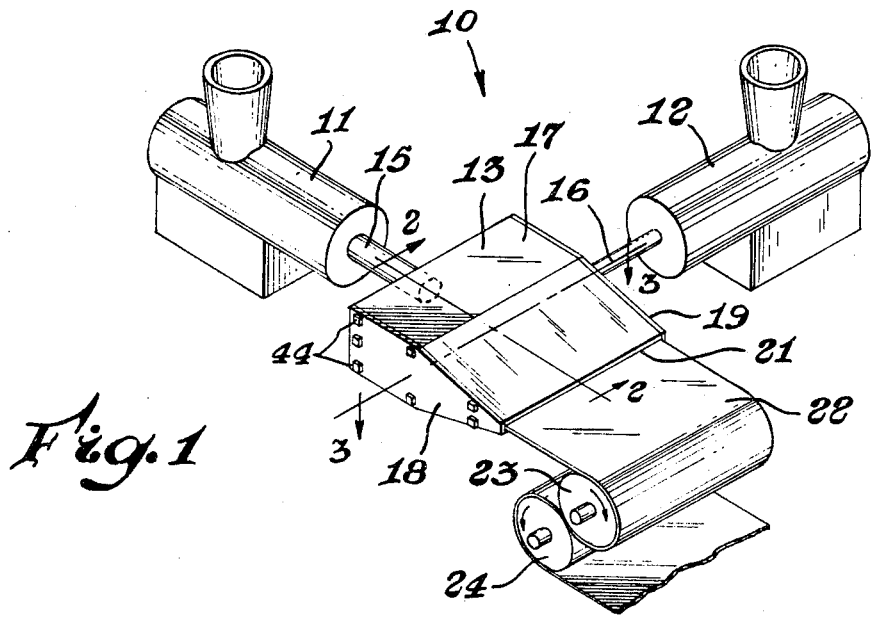

This invention relates to an improved method and apparatus for the production of multi-layer sheet and more particularly relates to a method and apparatus for the production of multi-layer sheet by the simultaneous extrusion of diverse resinous materials.

British Patent 985,310 discloses a method and apparatus for the preparation of synthetic resinous composite film by the simultaneous extrusion of two diverse heat-plastified synthetic resinous materials wherein a central or inner layer of resinous material is sandwiched between two outer layers of synthetic resinous material. The British patent employs what in essence can be considered as a die within a die. The die within the die extrudes a heat-plastified synthetic resinous material for the central layer, whereas the die containing the die extrudes the material for the outer layers. The apparatus disclosed in the British patent is capable of extruding a three-layer 2-component product or a three-layer three-component product. The inner die or extrusion orifice is substantially coextensive with the external orifice from which the composite heat-plastified stream emerges to form the composite sheet which is subsequently cooled below its heat-plastifying temperature. It is necessary that the inner die be of relatively heavy construction in order that it be sufficiently rigid to withstand the difference in pressure within the inner die and that existing on the outside of the inner die that is within the outer die.

If multi-layer film is to be prepared wherein the relative thickness of the layers is controlled by varying feed rates of the heat-plastified thermoplastic resinous material to the inner and outer dies, it would be beneficial if there were available a method and apparatus for the preparation of multi-layer film and sheeting which was simple, readily adjustable, and did not require two long housings, each defining an extrusion orifice of similar length.

It would be advantageous if there were available an extrusion apparatus comprising a die within a die wherein the inner die was of simplified construction. It would also be advantageous if there were available a simplified method and apparatus for the preparation of multi-layer synthetic resinous thermoplastic composite sheet which would readily permit variation of the thickness of the layers by the variation of the feed rates of the heat-plastified thermoplastic resinous materials to the die and the relative position of the center layer within the outer layer.

It would also be advantageous if there were available a method and apparatus for the preparation of multi-layer film wherein the resultant product was a sheet consisting of a continuous outer layer encapsulating an inner layer within.

These benefits and other advantages in accordance with the present invention are achieved in a method for the extrusion of a first stream of heat-plastified synthetic resinous material and a second stream of heat-plastified synthetic resinous material wherein the first stream is divided into a first substream and a second substream, the first substream and the second substream having a generally planar configuration and being disposed on either side of the second stream which has a generally planar configuration and simultaneously extruding the first substream, the second substream, and the second stream from an elongate slot-like extrusion orifice to produce a composite film having the material of the first substream and the second substream as the major surfaces thereof, encapsulating therein the material of the second stream wherein the material of the first and second substreams and the second substreams are generally coextensive with the resultant extruded sheet, the improvement which comprises restricting the flow of the first stream introducing between the first and second substreams the second stream from a generally slot-like orifice generally parallel to the first and second substreams and having a dimension substantially less in width than the first and second substreams, forming a composite stream from the first and second substreams, passing the composite first stream from an elongate slot-like extrusion orifice whereby the second stream is generally coextensive with the width of the extrusion orifice.

The method of the invention is beneficially practiced employing the apparatus in accordance with the invention which comprises a die, the die comprising a housing, the housing defining a cavity therein, the housing defining an elongate slot-like extrusion orifice in communiaction with the cavity, a first polymer supply passage communicating with the cavity and entering the cavity at a location generally remote from the extrusion orifice, an inner extrusion die disposed within the cavity intermediate between the first polymer passageway and the extrusion orifice, the inner extrusion die defining an inner extrusion die internal cavity, an inner die extrusion orifice, the inner extrusion die defining a second polymer supply passage communicating with the inner extrusion die cavity, the inner extrusion die orifice having a width substantially and significantly less than the width of the extrusion die orifice, the inner extrusion die in combination with the inner wall of the extrusion die defining the cavity, defining oppositely disposed passageways extending generally the width of the die cavity and forming a restriction to flow of material from the first polymer passageway to the extrusion orifice.

Further features and advantages of the present invention will become more apparent from the following specification when take in connection with the drawing wherein:

In FIGURE 1 there is schematically illustrated an apparatus in accordance with the invention.

Figure 2:
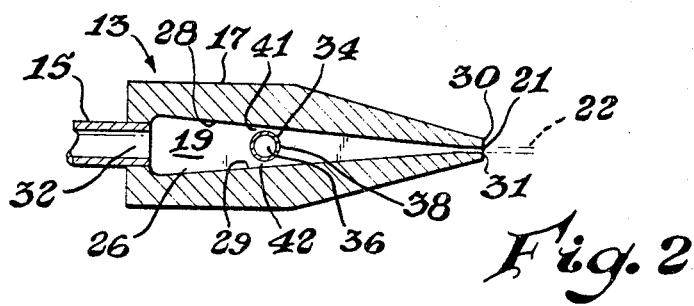

In FIGURE 2 there is illustrated a sectional view of the apparatus of FIGURE 1 taken along the line 2—2.

Figure 3:
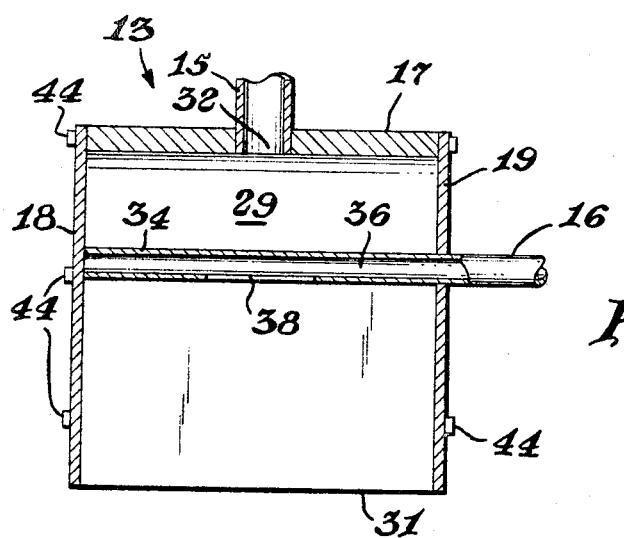

In FIGURE 3 there is illustrated a schematic representation of a sectional view of the apparatus of FIGURE 1 taken along the line 3—3.

In FIGURE 1 there is illustrated an apparatus generally designated by the reference numeral 10. The apparatus 10 is particularly suited and adapted for the extrusion of composite synthetic resinous thermoplastic film having at least two layers. The apparatus 10 comprises in cooperative combination a first extruder 11, a second extruder 12, and a die 13. The extruder 11 is in operative connection with the die 13 by means of a conduit 15. The extruder 12 is in operative communication with the die 13 by means of conduit 16. The die 13 comprises a body 17 having adjustable end plates 18 and 19. The die 17 defines an elongate extrusion orifice 21. A multi-layer synthetic resinous thermoplastic sheet 22 is shown issuing from the orifice 21. The sheet 22 is passed over a first cooling roll 23 and a second cooling roll 24.

In FIGURE 2 there is schematically illustrated a sectional view of the die 13 of FIGURE 1 taken along the line 2—2. The die body 17 defines an internal cavity 26 having the first inner wall 28 and a second inner wall 29. The die body defines an extrusion orifice 21 having die lips 30 and 31 and a first polymer inlet passage 32 in operative communication with the conduit 15 of the extruder 11. The inlet passage 32 is disposed remotely from the extrusion orifice 21. The walls 28 and 29 define a tapering configuration which converge toward the orifice 21. An inner die 34 is disposed within the cavity 26 and extends between the end plates or terminal portion 18 and 19 of the die body 17. The inner die 34 defines an internal cavity 36 and an elongate slot-like extrusion orifice 38 in generally parallel arrangement with the extrusion orifice 21. The extrusion orifice 38 is disposed remotely from the entrance passageway 32 and disposed generally adjacent the extrusion orifice 21. The inner die 34 in combination with the wall 28 defines a first restricted passageway 41 generally extending the entire length of the cavity 26, that is the width of the die. A second restricted passageway 42 is defined by the die 34 and the wall 29 of the die body 17.

In FIGURE 3 there is illustrated a sectional view of the die 13 taken along the line 3—3 of FIGURE 1 illustrating the adjustable end plates 18 and 19 secured to the die body 17 by a plurality of bolts 44. The bolts 44 pass through holes (not shown) in the end plates larger than the diameter of the bolts and sufficient to permit adjustment of the inner die 34 within the die body 17.

In operation of the apparatus and practice of the method of the invention, a first polymeric or thermoplastic resinous material is supplied in heat-plastified form from the extruder 11, passed through the conduit 15 into the passageway 32 which in turn fills the cavity 26, flowing past the inner die 34 by means of the restricted channels or passageways 41 and 42 and subsequently a heat plastified stream is discharged from the extrusion orifice 21 in the form of a sheet. A second stream of heat-plastified synthetic resinous thermoplastic material is supplied from the extruder 12 from the conduit 16 into the cavity 36 of the inner die 34. The material from the second extruder 12 then passes to the slot or extrusion orifice 38 into the portion of the cavity 26 lying between the inner die 34 in the extrusion orifice 21. The material from the slot 38 then flows outwardly within the cavity 26 to approach the end plates 18 and 19 and issues from the extrusion orifice 21 as an inner layer encapsulated between two outer layers, the inner layer approximating the width of the sheet issuing from the orifice 21. The heat-plastified composite stream or sheet 21 is then cooled to a temperature below the heat-plastifying temperature by the action of the cooling rolls 23 and 24 or by other suitable cooling means dependent upon the particular compositions being extruded. Beneficially, movement of the inner die 34 within the cavity 26 by adjustment of the end plates will cause the inner layer to assume a greater or lesser proportion of the total width of the sheet being extruded. For example, referring to FIGURE 2, if the inner die 34 is moved closer to the extrusion orifice 21 thereby reducing the total available cross-sectional area of the channels 41 and 42, the width of the inner layer in the extruded sheet will be almost equal to the total width of the sheet. Alternately, as the inner die 34 is moved away from the slot 21, the width of the inner layer decreases. The inner layer may be positioned closer to one surface or the other by moving the inner die 34 closer to or farther away from the wall 28 or 29 of the die body 17. If the inner die 34 is brought into contact with the wall 28 or 29, leaving one of the channels free and the other entirely restricted, a two-layer film will result rather than a three-layer configuration.

In preparation of the inner die a mechanical tubing, pipe, or similar cylindrical configuration of metal is beneficially employed and a small slit placed in a portion of the wall which will be generally centrally disposed relative to the extrusion slot of the die body 17. Advantageously, a relatively short slot may be employed such as from about $\frac{1}{10}$ to about $\frac{1}{2}$ the width of the extrusion orifice of the die 13. The shorter the slot of the inner die 34 is in length, the lighter the construction of the inner die may be. If the slot 38 of the inner die 34 approximates the width of the extrusion cavity orifice 21, a very heavy housing must be utilized in order to maintain a reasonable uniformity of the inner die orifice under delivery pressure. The shorter slot permits less massive construction of the inner die and yet maintains a relatively uniform distribution of the material of the inner layer within the material of the outer layers. If desired, restrictor bars positioned within the housing generally adjacent the housing 34 may be employed to restrict the passageways 41 and 42 rather than altering the position of the end plates 18 and 19. However, for most applications, it is preferred to vary the end plates as the settings, once established for a particular combination of layers in a film, are not frequently changed.

By way of further illustration a plurality of multilayer films were prepared employing apparatus generally as depicted in the drawing wherein ½ inch (nominal) schedule 40 stainless steel pipe is disposed within the cavity of a 16 inch wide sheeting die as the inner die. The extrusion orifice of the inner die is centrally disposed and has a slot of 5 inches by 0.015 inch in the wall parallel to the die slot of the outer die. In the following combinations the first named polymer is employed to form the outer layer; polyethylene-polypropylene, polyethylene-saran (a copolymer of vinylidene chloride and vinyl chloride), polyethylene-polystyrene, polystyrene-polypropylene and the like. Good spreading of the inner layer is obtained within the outer layers.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the extrusion of a composite stream of heat-plastified synthetic resinous material in a sheet-like configuration wherein the composite stream comprises at least three layers of diverse synthetic resinous material, the method comprising:

providing a first stream of heat-plastified synthetic resinous material to a restraining configuration, the restraining configuration having a generally slot-like extrusion orifice, dividing the first stream of heat-plastified synthetic resinous material into a first substream and a second substream having a generally planar configuration, providing a second stream of heat-plastified synthetic resinous material, the second stream having a generally planar configuration and a width substantially less than the first and second substreams, positioning the first and second substreams on either side of the second stream, subsequently, passing the first and second substreams and the second stream through an elongate slot-like extrusion orifice, the second stream being encapsulated within the first and second substreams in the composite stream, the second stream being generally coextensive with the resultant extruded sheet, the improvement which comprises restricting the flow of the first stream generally at the point where it is divided into the first and second substreams and introducing between the first and second substreams the second stream in a generally planar configuration generally parallel to the first and second substrates and having a dimension substantially less in width than the first and second substreams, and passing the first and second substreams and the second stream to the extrusion orifice by means of a tapering configuration which converges toward the orifice.

2. The method of claim 1 wherein the first stream is divided by a generally cylindrical configuration.

3. The method of claim 2 wherein the generally cylindrical configuration supplies a generally centrally disposed second stream.

4. The method of claim 3 wherein the cylindrical configuration is supplied with the second stream in a generally axial manner.

5. The method of claim 1 wherein the first stream is supplied to the restraining configuration at a location remote from the extrusion orifice.

6. The method of claim 1 including the step of varying the restriction of the first stream to obtain the desired degree of splitting of the second stream between the first and second substreams.

7. An apparatus for the extrusion of a multi-layer plastic film or sheet, the apparatus comprising a die, the die comprising a housing, the housing defining a cavity therein, the housing defining an elongate slot-like extrusion orifice in communication with the cavity by means of a tapering configuration, a first polymer supply passage communicating with the cavity and entering the cavity at a location generally remote from the extrusion orifice, an inner extrusion die disposed within the cavity intermediate between the first polymer passageway and the extrusion orifice, the inner extrusion die defining an inner extrusion die internal cavity an inner die extrusion orifice having a slot-like configuration, the inner extrusion die defining a second polymer supply passage communicating with the inner die cavity, the inner extrusion die orifice having a width substantially and significantly less than the width of the extrusion die orifice, the inner extrusion die in combination with the inner wall of the extrusion die defining oppositely disposed passageways extending generally the width of the die cavity and forming a restriction to flow of material from the first polymer passageway to the extrusion orifice.

8. The apparatus of claim 7 wherein the die housing has a pair of end plates which are adjustable in relationship to the die housing.

9. The apparatus of claim 8 wherein the inner die is rigidly affixed to the end plates.

10. The apparatus of claim 7 wherein the inner die extrusion orifice is disposed generally adjacent the die extrusion orifice and remote from the first polymer supply passage.

11. The apparatus of claim 7 wherein the inner die has a generally cylindrical configuration.

12. The apparatus of claim 11 wherein the inner die cavity has a generally cylindrical configuration.

13. The apparatus of claim 7 wherein the second polymer supply passage is generally axially disposed with relationship to the inner die.

References Cited

UNITED STATES PATENTS

| | | | |
|---|---|---|---|
| 2,985,556 | 5/1961 | Rowland | 18—13 |
| 3,274,646 | 9/1966 | Krystof | 18—13 |

FOREIGN PATENTS

| | | |
|---|---|---|
| 985,310 | 3/1965 | Great Britain. |

ROBERT F. WHITE, *Primary Examiner.*

G. AUVILLE, *Assistant Examiner.*